United States Patent
Kalatzis

(10) Patent No.: US 12,463,696 B2
(45) Date of Patent: Nov. 4, 2025

(54) CELLULAR NETWORK OVER THE AIR USER EQUIPMENT BEAM MANAGEMENT EMULATION AND TESTING

(71) Applicant: VIAVI Solutions Inc., Chandler, AZ (US)

(72) Inventor: Charalampos Kalatzis, Beds (GB)

(73) Assignee: VIAVI Solutions Inc., Chandler, AZ (US)

(*) Notice: Subject to any disclaimer, the term of this patent is extended or adjusted under 35 U.S.C. 154(b) by 473 days.

(21) Appl. No.: 17/823,636

(22) Filed: Aug. 31, 2022

(65) Prior Publication Data
US 2023/0082619 A1 Mar. 16, 2023

Related U.S. Application Data

(60) Provisional application No. 63/261,070, filed on Sep. 10, 2021.

(51) Int. Cl.
*H04B 7/06* (2006.01)
*H04W 72/04* (2023.01)
*H04W 72/0453* (2023.01)

(52) U.S. Cl.
CPC ...... *H04B 7/0619* (2013.01); *H04W 72/0453* (2013.01)

(58) Field of Classification Search
CPC ... H04W 28/04; H04W 72/04; H04W 72/042; H04W 88/08; H04W 72/0453; H04B 7/0695; H04B 7/0619
USPC .......................................................... 370/329
See application file for complete search history.

(56) References Cited

U.S. PATENT DOCUMENTS

| 8,345,532 B2* | 1/2013 | Stirling-Gallacher ...................... H04B 7/0697 370/335 |
| 11,626,910 B2* | 4/2023 | Petersson .............. H04L 5/0023 370/329 |
| 11,626,919 B2* | 4/2023 | Marinier ............ H04B 7/06966 370/329 |

(Continued)

FOREIGN PATENT DOCUMENTS

WO    WO 2018/129300 A1 *  7/2018  ............... H04B 7/08

OTHER PUBLICATIONS

Extended European Search Report for Application No. EP22193854.1 mailed on Dec. 14, 2022, 9 pages.

*Primary Examiner* — Peter G Solinsky
*Assistant Examiner* — Sanjay K Dewan
(74) *Attorney, Agent, or Firm* — Harrity & Harrity, LLP

(57) ABSTRACT

A device may receive configuration data identifying bands and frequencies utilized by a plurality of user equipments and may generate a user equipment broad beam based on the configuration data. The device may transmit the user equipment broad beam towards a base station with a single user equipment fixed broad beam antenna of the device and may receive, from the base station, feedback data associated with the user equipment broad beam transmitted towards the base station. The device may determine whether the feedback data identifies one or more errors at the base station for one or more of the plurality of user equipments and may perform one or more actions based on determining whether the feedback data identifies the one or more errors at the base station for one or more of the plurality of user equipments.

20 Claims, 7 Drawing Sheets

(56) References Cited

U.S. PATENT DOCUMENTS

| | | | | |
|---|---|---|---|---|
| 11,638,218 B2* | 4/2023 | He | ............... | H04W 52/225 |
| | | | | 370/329 |
| 11,641,642 B2* | 5/2023 | Levitsky | ............... | H04L 5/0057 |
| | | | | 370/329 |
| 11,658,727 B2* | 5/2023 | Farag | ............... | H04B 7/088 |
| | | | | 370/329 |
| 11,695,462 B2* | 7/2023 | Raghavan | ............... | H04L 5/0023 |
| | | | | 370/329 |
| 11,723,049 B2* | 8/2023 | Xi | ............... | H04L 5/0094 |
| | | | | 370/329 |
| 11,764,854 B2* | 9/2023 | Raghavan | ............... | H04B 7/0452 |
| | | | | 370/329 |
| 11,791,882 B2* | 10/2023 | Islam | ............... | H04W 74/0833 |
| | | | | 370/329 |
| 2002/0154059 A1* | 10/2002 | Lindenmeier | ............... | H04B 7/0808 |
| | | | | 455/277.1 |
| 2019/0150133 A1* | 5/2019 | Li | ............... | H04W 24/10 |
| | | | | 375/224 |
| 2020/0186261 A1* | 6/2020 | Devarasetty | ............... | H04B 7/0617 |
| 2020/0209296 A1* | 7/2020 | Kong | ............... | G01R 29/0878 |
| 2020/0374751 A1* | 11/2020 | Krishnaswamy | ............... | H04L 12/413 |
| 2023/0180259 A1* | 6/2023 | Guo | ............... | H04L 5/0051 |
| | | | | 370/329 |

* cited by examiner

CELLULAR NETWORK OVER THE AIR USER EQUIPMENT BEAM MANAGEMENT EMULATION AND TESTING

CROSS-REFERENCE TO RELATED APPLICATION

This Patent Application claims priority to U.S. Provisional Patent Application No. 63/261,070, filed on Sep. 10, 2021, entitled "CELLULAR NETWORK OVER THE AIR USER EQUIPMENT BEAM MANAGEMENT EMULATION AND TESTING," which is hereby expressly incorporated by reference herein.

BACKGROUND

Fifth generation (5G) New Radio (NR) 3GPP standards include various beam management procedures to address beamforming characteristics of a base station (e.g., a gNodeB or gNB) and testing devices with user equipment (UE) antennas. 5G NR beam management process 3 (P3) has to do with UE antenna beam refinement for frequency range 2 (e.g., a millimeter wave range of 24,250 megahertz (MHz) to 52,600 MHz) test cases. For P3, the gNB transmits a specific beam in the downlink (DL) and the UE scans various received beam directions and selects a best (e.g., normally a most powerful) beam. In a sounding reference signal (SRS) beam scanning process, the UE scans various transmission beam directions and the gNB selects a best (e.g., normally a most powerful) beam.

SUMMARY

In some implementations, a method may include receiving configuration data identifying bands and frequencies utilized by a plurality of user equipments and generating a user equipment broad beam based on the configuration data. The method may include transmitting the user equipment broad beam towards a base station with a single user equipment fixed broad beam antenna of the device and receiving, from the base station, feedback data associated with the user equipment broad beam transmitted towards the base station. The method may include determining whether the feedback data identifies one or more errors at the base station for one or more of the plurality of user equipments and performing one or more actions based on determining whether the feedback data identifies the one or more errors at the base station for one or more of the plurality of user equipments.

In some implementations, a device includes one or more memories and one or more processors to receive configuration data identifying bands and frequencies utilized by a plurality of user equipments and generate a user equipment broad beam based on the configuration data, wherein the user equipment broad beam emulates one of a fifth-generation New Radio beam scanning process 3 or a sounding reference signal beam scanning. The one or more processors may transmit the user equipment broad beam towards a base station with a single user equipment fixed broad beam antenna of the device and may receive, from the base station, feedback data associated with the user equipment broad beam transmitted towards the base station. The one or more processors may determine whether the feedback data identifies one or more errors at the base station for one or more of the plurality of user equipments and may perform one or more actions based on determining whether the feedback data identifies the one or more errors at the base station for one or more of the plurality of user equipments.

In some implementations, a non-transitory computer-readable medium may store a set of instructions that includes one or more instructions that, when executed by one or more processors of a device, cause the device to receive configuration data identifying bands and frequencies utilized by a plurality of user equipments and generate, based on the configuration data, a user equipment broad beam with a range of bands that includes the bands utilized by the plurality of user equipments and a range of frequencies that includes the frequencies utilized by the plurality of user equipments. The one or more instructions may cause the device to transmit the user equipment broad beam towards a base station with a single user equipment fixed broad beam antenna of the device and receive, from the base station, feedback data associated with the user equipment broad beam transmitted towards the base station. The one or more instructions may cause the device to determine whether the feedback data identifies one or more errors at the base station for one or more of the plurality of user equipments and perform one or more actions based on determining whether the feedback data identifies the one or more errors at the base station for one or more of the plurality of user equipments.

DETAILED DESCRIPTION

Figure 1A:
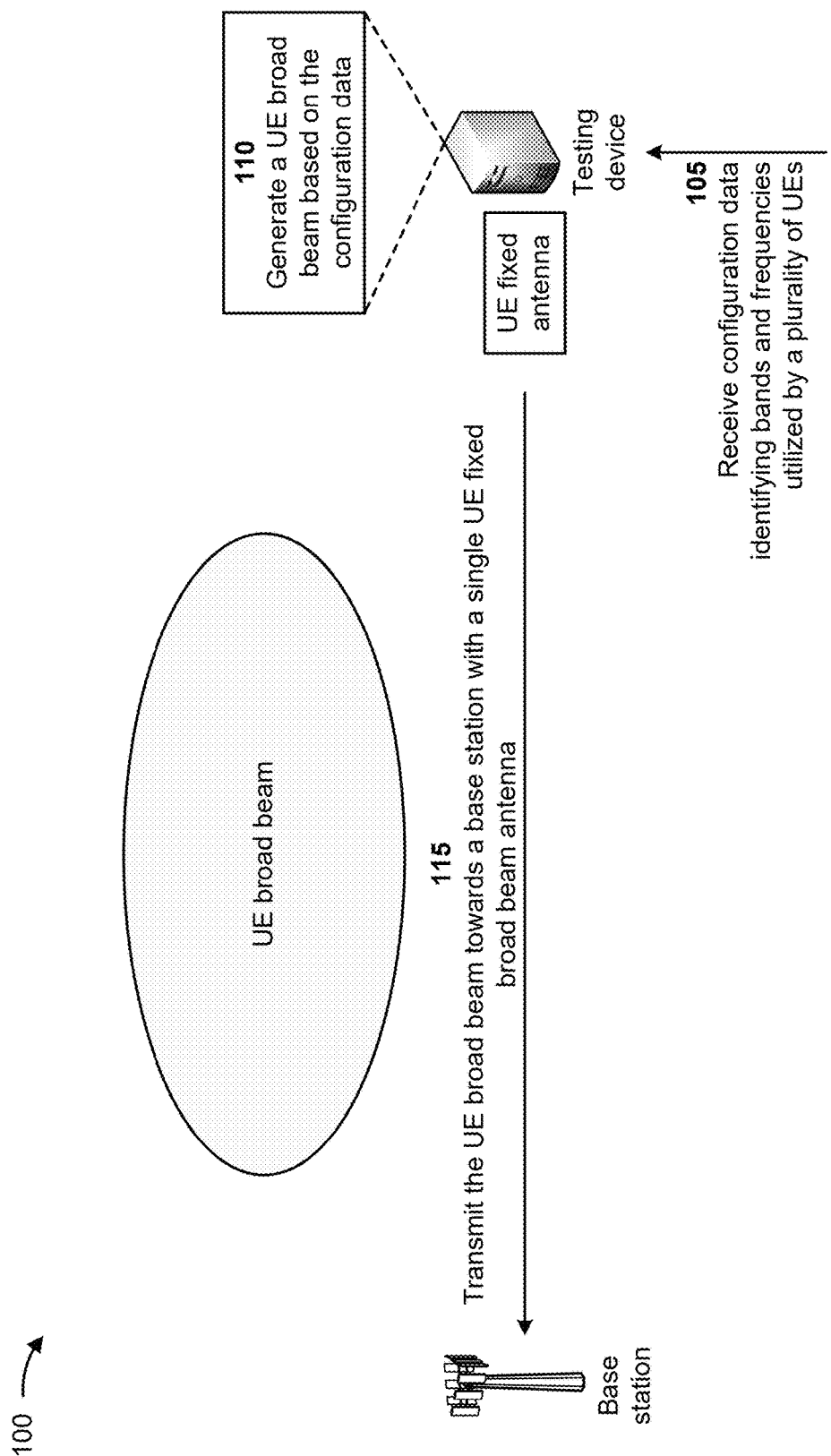
FIGS. 1A-1D are diagrams of an example associated with providing cellular network over the air (OTA) UE beam management emulation and testing.

The following detailed description of example implementations refers to the accompanying drawings. The same reference numbers in different drawings may identify the same or similar elements.

Current beam management processes require expensive and complex active antenna panels for a UE emulation testing device. For example, the cost of a millimeter wave active antenna panel may be greater than $10,000. Active antenna panels are typically narrow band, which presents challenges for multiple band or full band coverage by a testing device. Furthermore, while the gNB is scanning transmitted DL beams through various synchronization signal blocks, the UE is scanning received DL beams in a parallel manner. However, this concurrent but not synchronous beam scanning causes extra delay in a UE attachment procedure. Mobile testing devices may emulate a large quantity of UEs at the same time. However, due to the nature of the active antenna panel, trying to emulate multiple P3 processes from multiple UEs at a same symbol is only possible if beam scanning for different UEs is coherent. This means that at any symbol, all the UEs may only receive a beam pointing at the same direction relative to the gNB. The same is true for the SRS beam scanning process, where multiple UEs at a same symbol can only transmit beams pointing at the same direction.

Thus, current beam management processes waste computing resources (e.g., processing resources, memory resources, communication resources, and/or the like), network resources, and/or other resources associated with purchasing expensive active antenna panels, being unable to emulate and test multiple UEs for a base station, handling delays associated with the UE attachment procedure, and/or the like.

Some implementations described herein provide a device (e.g., a testing device) that provides cellular network OTA UE beam management emulation and testing. For example, the device may receive configuration data identifying bands and frequencies utilized by a plurality of UEs and may generate a UE broad beam based on the configuration data. The device may transmit the UE broad beam towards a base station with a single UE fixed broad beam antenna of the device and may receive, from the base station, feedback data associated with the UE broad beam transmitted towards the base station. The device may determine whether the feedback data identifies one or more errors at the base station for one or more of the plurality of UEs, and may perform one or more actions based on determining whether the feedback data identifies the one or more errors at the base station for one or more of the plurality of UEs.

In this way, the device may provide cellular network OTA UE beam management emulation and testing. For example, the device may include a single fixed broad beam antenna (e.g., for transmission and reception) that emulates effects of P3 beam scanning, due to reception of different DL beams, by emulating a DL reception level change due to different received beams. The fixed broad beam antenna may generate different bands and frequencies utilized by different UEs and may cover different frequency ranges. The device may test different types of UEs at the same time, may emulate a large quantity of UEs at the same time, and may determine whether errors occur at a gNB for any of the UEs. For the SRS beam scanning process, the device may emulate different beam directions by transmitting a plurality of SRSs with different UL transmission levels. Thus, the device may conserve computing resources, networking resources, and other resources that would have otherwise been consumed by purchasing expensive active antenna panels, being unable to emulate and test multiple UEs for a base station, handling delays associated with the UE attachment procedure, and/or the like.

FIGS. 1A-1D are diagrams of an example 100 associated with providing cellular network OTA UE beam management emulation and testing. As shown in FIGS. 1A-1D, example 100 includes a base station associated with a testing device. The base station may include a test base station that simulates functionalities of an actual base station provided in a network, such as a cellular network. In some implementations, the testing device includes a single UE fixed broad beam antenna. Further details of the base station and the testing device are provided below.

As shown in FIG. 1A, and by reference number 105, the test device may receive configuration data identifying bands and frequencies utilized by a plurality of UEs. In some implementations, the functionality of the base station is to be tested with respect to the bands and the frequencies utilized by the plurality of UEs. The configuration data may include data identifying different types of the plurality of UEs, different frequency bands utilized by the different types of the plurality of UEs, different frequencies utilized by the different types of the plurality of UEs, different downlink reception level changes caused by different reception beams associated with the plurality of UEs, different beam directions caused by SRSs with different uplink transmission levels, applications of the base station to be tested, and/or other testing parameters associated with testing the base station. In some implementations, the configuration data is provided to the testing device by a user of the testing device.

As further shown in FIG. 1A, and by reference number 110, the testing device may generate a UE broad beam based on the configuration data. For example, the testing device may generate the UE broad beam with a range of bands that includes the bands utilized by the plurality of UEs and with a range of frequencies that includes the frequencies utilized by the plurality of UEs. In some implementations, the UE broad beam may emulate a 5G NR beam scanning process 3 (P3) or an SRS beam scanning. With respect to 5G NR beam scanning process 3, the UE broad beam may emulate a downlink reception level change due to different respective reception beams associated with the plurality of UEs. With respect to the SRS beam scanning, the UE broad beam may emulate different respective beam directions based on a plurality of SRSs with different respective uplink transmission levels.

In some implementations, the UE broad beam may include a frequency range 2 (e.g., a millimeter wave range from approximately 24,250 MHz to approximately 52,600 MHz). The UE broad beam may emulate the bands utilized by the plurality of UEs simultaneously with the frequencies utilized by the plurality of UEs, may emulate each of the plurality of UEs simultaneously, and/or the like.

As further shown in FIG. 1A, and by reference number 115, the testing device may transmit the UE broad beam towards the base station with the single UE fixed broad beam antenna of the testing device. In some implementations, the single UE fixed broad beam antenna may generate the UE broad beam based on the configuration data and may transmit the UE broad beam towards the base station. The single UE fixed broad beam antenna may enable the testing device to select a best reception beam on a downlink (e.g., a most powerful reception beam) received from the base station based on comparing radio frequency levels of beams received from the base station. The single UE fixed broad beam antenna may enable the base station to select a best transmission beam on an uplink (e.g., a most powerful transmission beam) received from the testing device based on comparing signal-to-noise ratios of beams received from the testing device. The testing device and the base station may not detect a different angle of arrival for different beams originating from a specific location (e.g., in a line of sight channel) so the UE broad beam generated by the single UE fixed broad beam antenna will be fully realistic. The single UE fixed broad beam may prevent delays associated with a downlink attachment procedure.

Figure 1B:
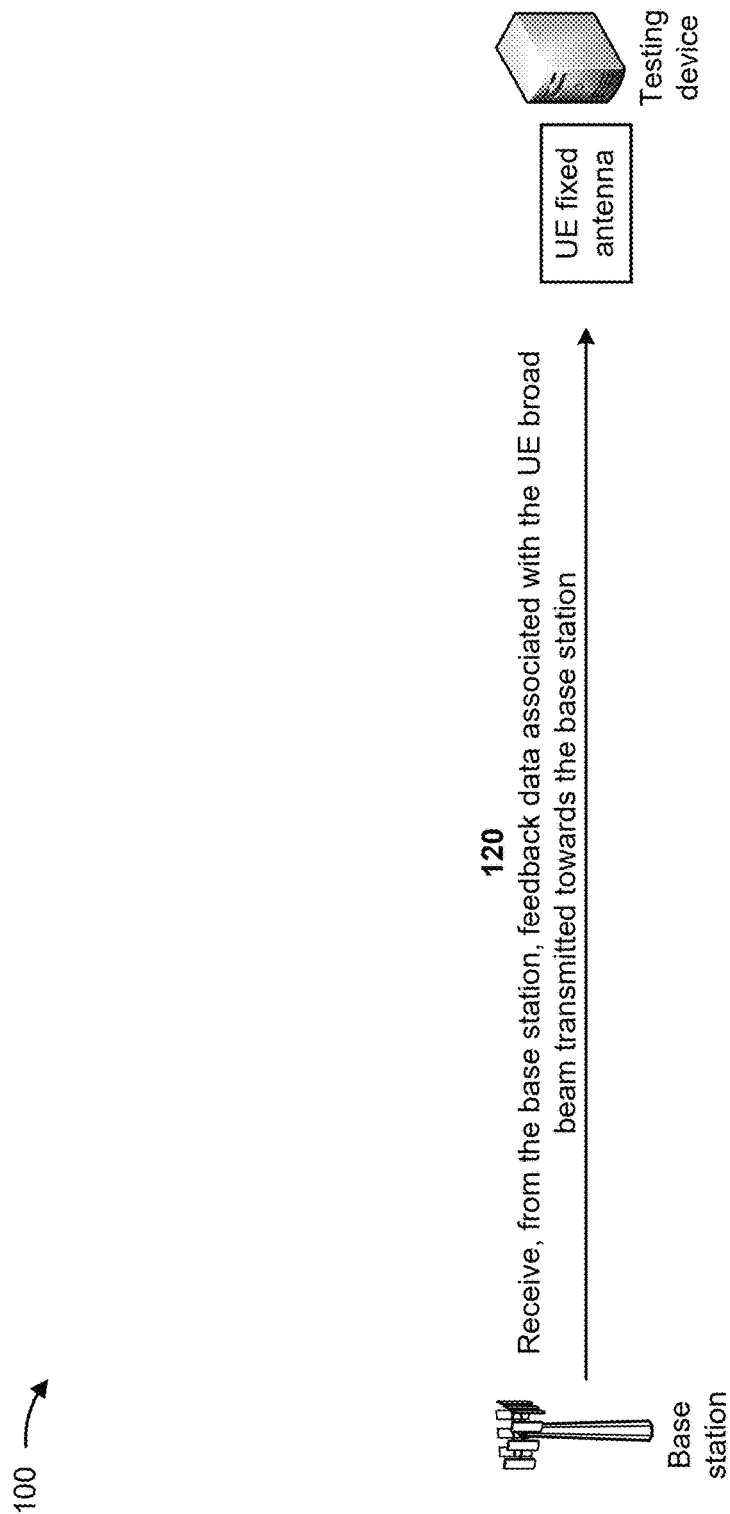

As shown in FIG. 1B, and by reference number 120, the testing device may receive, from the base station, feedback data associated with the UE broad beam transmitted towards the base station. The base station may receive the UE broad beam or one or more portions of the UE broad beam and may perform one or more functions based on receiving the UE broad beam. For example, the base station may perform a beam selection process in which the base station selects best transmission beams on the uplink from the UE broad beam. The base station may generate the feedback data based on performing the one or more functions. For example, the base station may experience one or more errors associated with the one or more functions, may experience no errors associated with the one or more functions, and/or the like. The feedback data may include data identifying one or more applications of the base station, the one or more functions of the base station, whether an error occurred for any of the one or more applications, whether an error occurred for any of the one or more functions, one or more of the plurality of UEs associated with the errors, and/or the like.

Figure 1C:
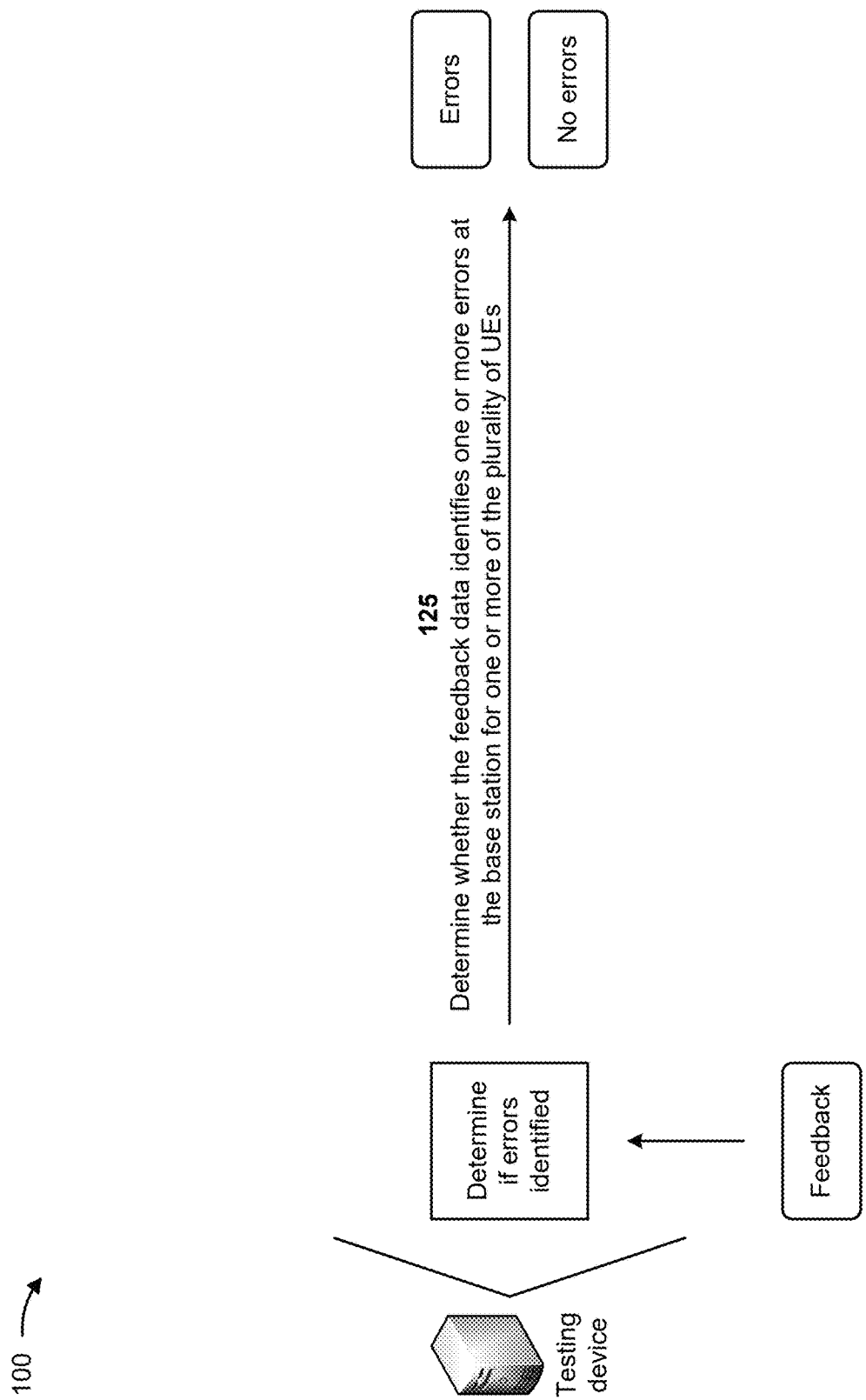

As shown in FIG. 1C, and by reference number 125, the testing device may determine whether the feedback data identifies one or more errors at the base station for one or more of the plurality of UEs. For example, the testing device may analyze the feedback data to determine whether the feedback data identifies one or more errors at the base station for one or more of the plurality of UEs. As shown in FIG. 1C, the testing device may determine that the feedback data identifies errors at the base station for one or more of the plurality of UEs, may determine that the feedback data identifies no errors at the base station for one or more of the plurality of UEs, and/or the like. For example, the feedback data may indicate that an application of the base station functions properly for all of the plurality of UEs, except for a particular UE. In such an example, the testing device may determine that the feedback data identifies no errors at the base station for all of the plurality of UEs, except for the particular UE. The testing device may determine that the feedback data identifies an error at the base station for the particular UE.

Figure 1D:
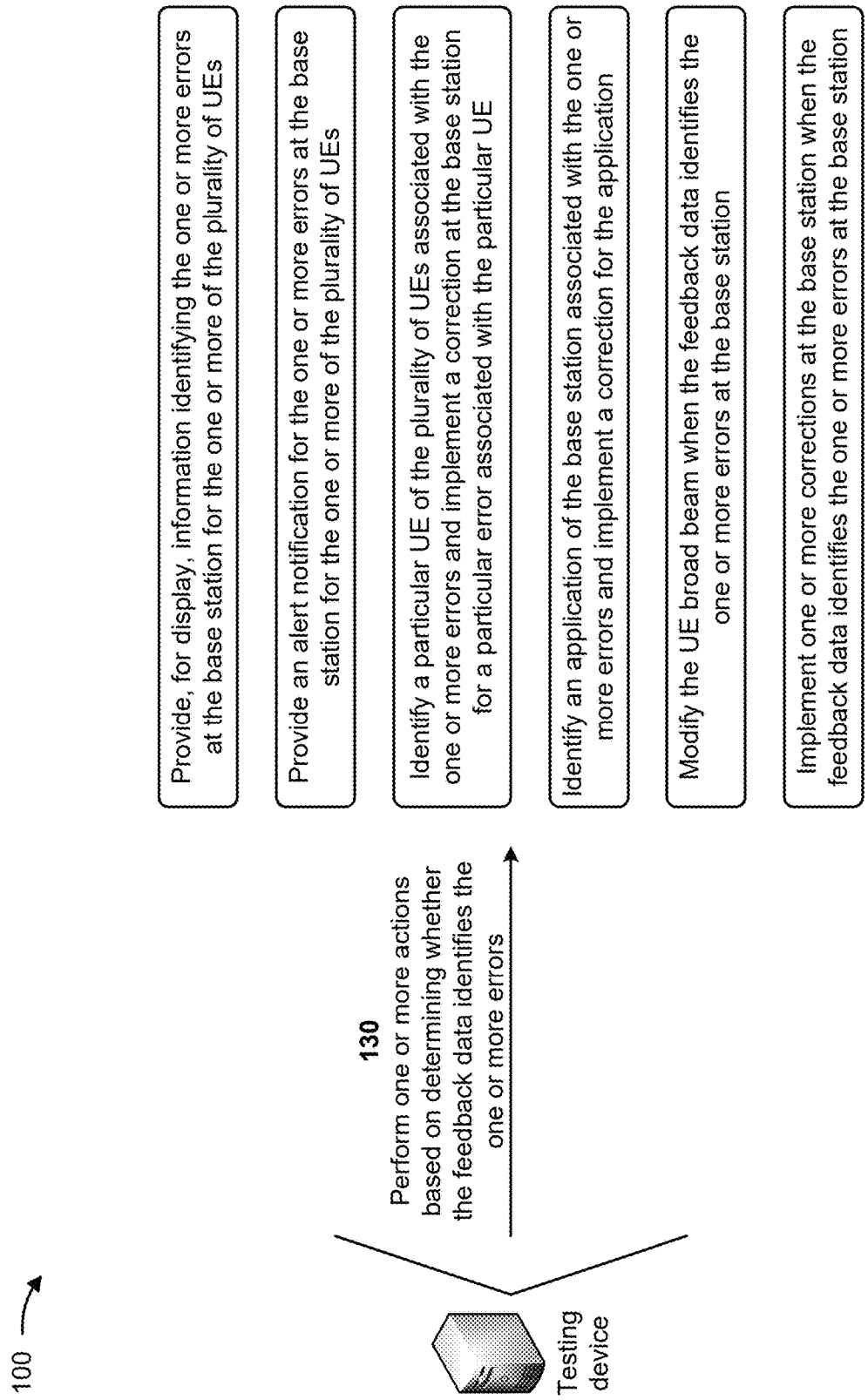

As shown in FIG. 1D, and by reference number 130, the testing device may perform one or more actions based on determining whether the feedback identifies the one or more errors. In some implementations, the one or more actions include the testing device providing, for display, information identifying the one or more errors at the base station for the one or more of the plurality of UEs. For example, the testing device may display information identifying an error in an application of the base station for a particular UE of the plurality of UEs. In this way, the testing device may prevent the erroneous application from being implemented in an actual base station, which may conserve computing resources, networking resources, and other resources that would have otherwise been consumed by implementation of the erroneous application.

In some implementations, the one or more actions include the testing device providing an alert notification for the one or more errors at the base station for the one or more of the plurality of UEs. For example, the testing device may provide an alert notification identifying an error in a function of the base station for a particular UE of the plurality of UEs. In this way, the testing device may prevent the erroneous function from being implemented in an actual base station, which may conserve computing resources, networking resources, and other resources that would have otherwise been consumed by implementation of the erroneous function.

In some implementations, the one or more actions include the testing device identifying a particular UE of the plurality of UEs associated with the one or more errors and implementing a correction at the base station for a particular error associated with the particular UE. For example, the testing device may determine that the particular UE is associated with an error in a function of the base station. The testing device may determine a correction for the error in the function and may implement the correction for the error in the function at the base station. In this way, the testing device may enable the corrected function to be implemented in an actual base station, which may conserve computing resources, networking resources, and other resources that would have otherwise been consumed by implementation of the erroneous function in the actual base station.

In some implementations, the one or more actions include the testing device identifying an application of the base station associated with the one or more errors and implementing a correction for the application. For example, the testing device may determine that the application of the base station is associated with an error. The testing device may determine a correction for the error in the application and may implement the correction for the error in the application at the base station. In this way, the testing device may enable the corrected application to be implemented in an actual base station, which may conserve computing resources, networking resources, and other resources that would have otherwise been consumed by implementation of the erroneous application in the actual base station.

In some implementations, the one or more actions include the testing device modifying the UE broad beam when the feedback data identifies the one or more errors at the base station. For example, an error at the base station may be associated with a frequency range of the UE broad beam and the testing device may modify the frequency range of the UE broad beam in order to address the error at the base station. In this way, the testing device may enable the modified frequency range to be handled by an actual base station, which may conserve computing resources, networking resources, and other resources that would have otherwise been consumed by handling of the erroneous frequency range at the actual base station.

In some implementations, the one or more actions include the testing device implementing one or more corrections at the base station when the feedback data identifies the one or more errors at the base station. For example, the testing device may determine one or more corrections for the one or more errors at the base station and may implement the one or more corrections at the base station. In this way, the testing device may enable the corrections to be implemented in an actual base station, which may conserve computing resources, networking resources, and other resources that would have otherwise been consumed by implementation of the errors in the actual base station.

In this way, the testing device may provide cellular network OTA UE beam management emulation and testing. For example, the testing device may include a single fixed broad beam antenna (e.g., for transmission and reception) that emulates effects of P3 beam scanning, due to reception of different DL beams, by emulating a DL reception level change due to different received beams. The fixed broad beam antenna may generate different bands and frequencies utilized by different UEs and may cover different frequency ranges. The testing device may test different types of UEs at the same time, may emulate a large quantity of UEs at the same time, and may determine whether errors occur at a gNB for any of the UEs. For the SRS beam scanning process, the testing device may emulate different beam directions by transmitting a plurality of SRSs with different UL transmission levels. Thus, the testing device may conserve computing resources, networking resources, and other resources that would have otherwise been consumed by purchasing expensive active antenna panels, being unable to emulate and test multiple UEs for a base station, handling delays associated with the UE attachment procedure, and/or the like.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
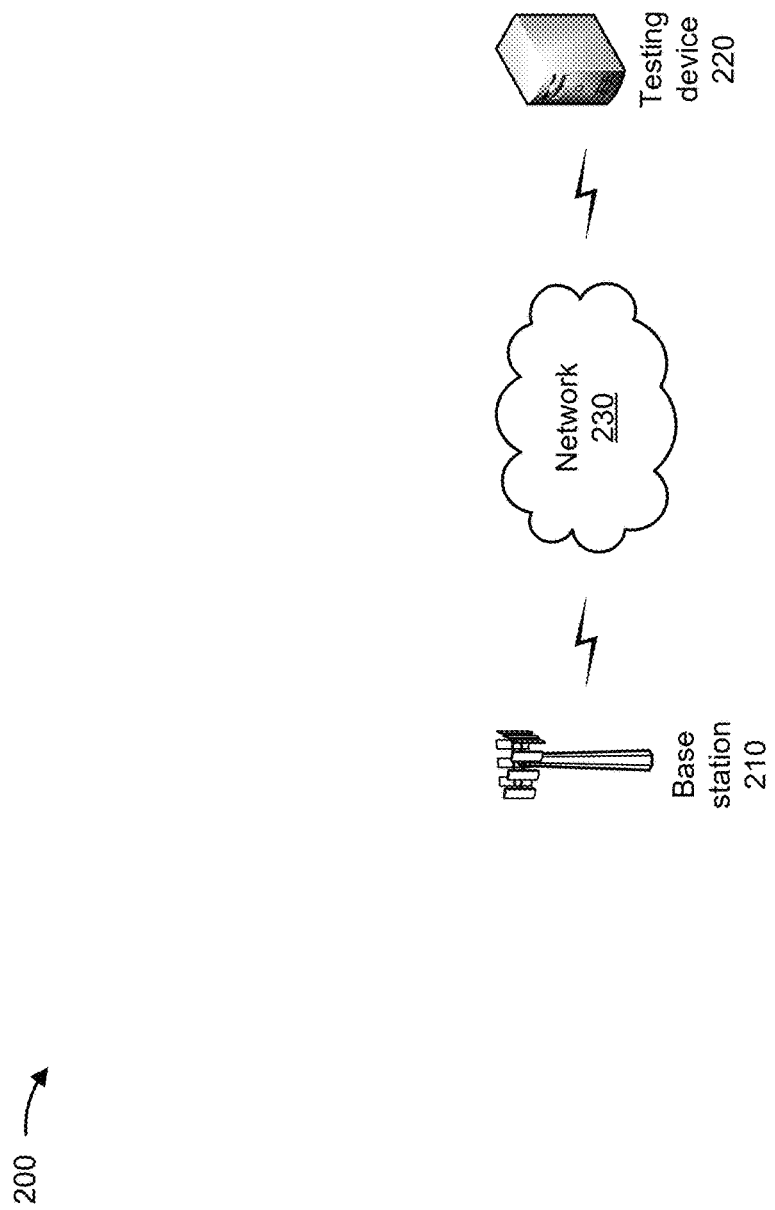
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a base station 210, a testing device 220, and/or a network 230. Devices and/or elements of environment 200 may interconnect via wired connections and/or wireless connections.

Base station 210 includes one or more devices capable of transferring traffic, such as audio, video, text, and/or other traffic, destined for and/or received from a UE. For example, base station 210 may include an eNodeB (eNB) associated with an LTE network that receives traffic from and/or sends traffic to a core network, a gNodeB (gNB) associated with a RAN of a 5G network, a base transceiver station, a radio base station, a base station subsystem, a cellular site, a cellular tower, an access point, a transmit receive point (TRP), a radio access node, a macrocell base station, a microcell base station, a picocell base station, a femtocell base station, and/or another network entity capable of supporting wireless communication.

Testing device 220 includes one or more devices capable of receiving, generating, storing, processing, providing, and/or routing information, as described elsewhere herein. Testing device 220 may include a communication device and/or a computing device. For example, testing device 220 may include a device that emulates one or more UEs, such as one or more wireless communication devices, mobile phones, laptop computers, tablet computers, gaming consoles, set-top boxes, wearable communication devices (e.g., smart wristwatches, smart eyeglasses, head mounted displays, or virtual reality headsets), or similar types of devices.

Network 230 includes one or more wired and/or wireless networks. For example, network 230 may include a cellular network (e.g., a 5G network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. Network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
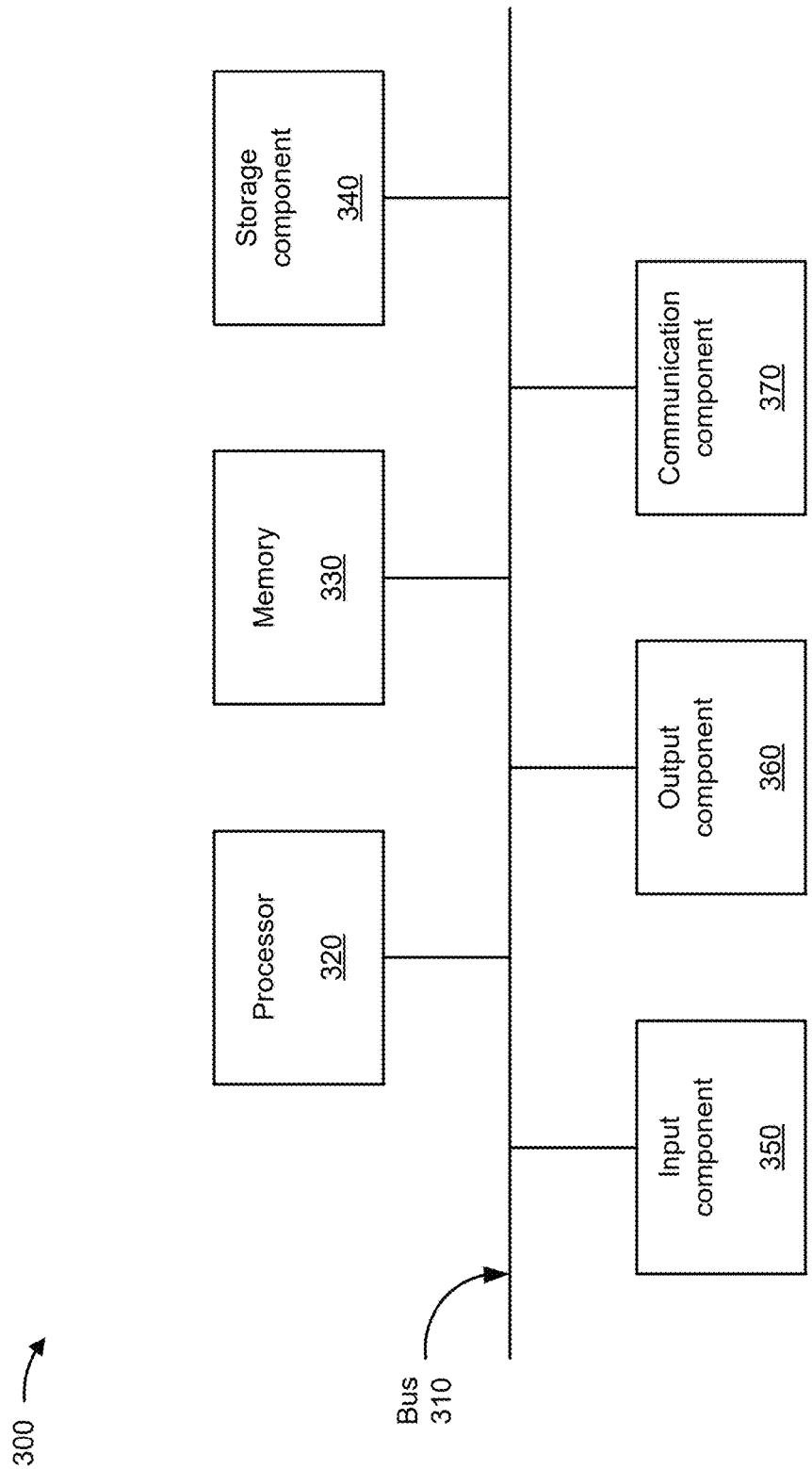
FIG. 3 is a diagram of example components of one or more devices of FIG. 2.

FIG. 3 is a diagram of example components of one or more devices of FIG. 3. The one or more devices may include a device 300, which may correspond to base station 210 and/or testing device 220. In some implementations, base station 210 and/or testing device 220 may include one or more devices 300 and/or one or more components of the device 300. As shown in FIG. 3, the device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables the device 300 to communicate with other devices, such as via a wired connection and/or a wireless connection. For example, communication component 370 may include a receiver, a transmitter, a transceiver, a modem, a network interface card, and/or an antenna.

The device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
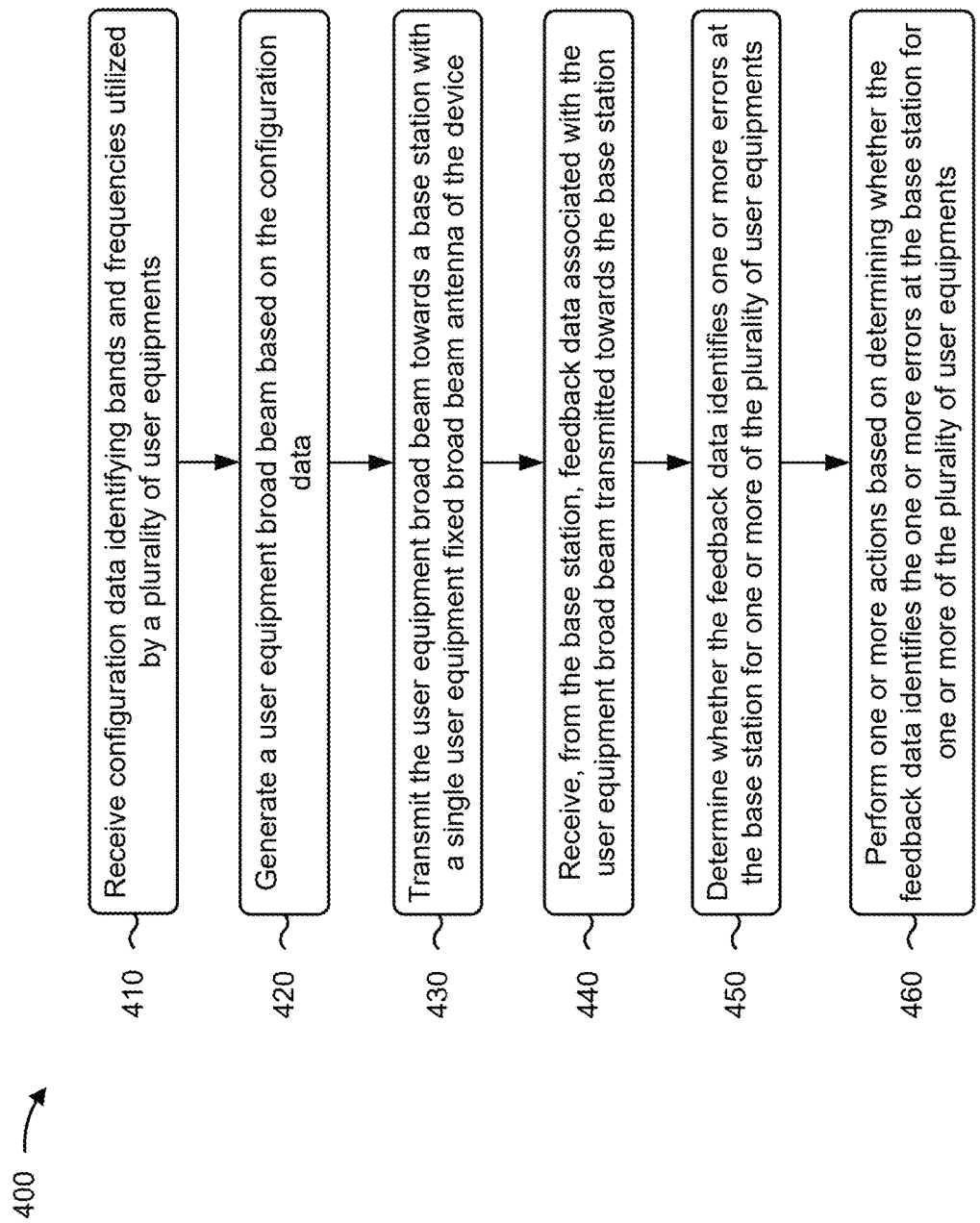
FIG. 4 is a flowchart of an example process for providing cellular network over the air (OTA) UE beam management emulation and testing.

FIG. 4 is a flowchart of an example process 400 for providing cellular network OTA UE beam management emulation and testing. In some implementations, one or more process blocks of FIG. 4 may be performed by a device (e.g., testing device 220). In some implementations, one or more process blocks of FIG. 4 may be performed by another device or a group of devices separate from or including the device, such as a base station (e.g., base station 210). Additionally, or alternatively, one or more process blocks of FIG. 4 may be performed by one or more components of the device 300, such as processor 320, memory 330, storage component 340, input component 350, output component 360, and/or communication component 370.

As shown in FIG. 4, process 400 may include receiving configuration data identifying bands and frequencies utilized by a plurality of user equipments (block 410). For example, the device may receive configuration data identifying bands and frequencies utilized by a plurality of user equipments, as described above.

As further shown in FIG. 4, process 400 may include generating a user equipment broad beam based on the configuration data (block 420). For example, the device may generate a user equipment broad beam based on the configuration data, as described above.

As further shown in FIG. 4, process 400 may include transmitting the user equipment broad beam towards a base station with a single user equipment fixed broad beam antenna of the device (block 430). For example, the device may transmit the user equipment broad beam towards a base station with a single user equipment fixed broad beam antenna of the device, as described above.

As further shown in FIG. 4, process 400 may include receiving, from the base station, feedback data associated with the user equipment broad beam transmitted towards the base station (block 440). For example, the device may receive, from the base station, feedback data associated with the user equipment broad beam transmitted towards the base station, as described above.

As further shown in FIG. 4, process 400 may include determining whether the feedback data identifies one or more errors at the base station for one or more of the plurality of user equipments (block 450). For example, the device may determine whether the feedback data identifies one or more errors at the base station for one or more of the plurality of user equipments, as described above.

As further shown in FIG. 4, process 400 may include performing one or more actions based on determining whether the feedback data identifies the one or more errors at the base station for one or more of the plurality of user equipments (block 460). For example, the device may perform one or more actions based on determining whether the feedback data identifies the one or more errors at the base station for one or more of the plurality of user equipments, as described above.

Process 400 may include additional implementations, such as any single implementation or any combination of implementations described below and/or in connection with one or more other processes described elsewhere herein.

In a first implementation, performing the one or more actions includes one or more of providing, for display, information identifying the one or more errors at the base station for the one or more of the plurality of user equipments; providing an alert notification for the one or more errors at the base station for the one or more of the plurality of user equipments; or modifying the user equipment broad beam when the feedback data identifies the one or more errors at the base station.

In a second implementation, alone or in combination with the first implementation, performing the one or more actions includes identifying a particular user equipment of the plurality of user equipments associated with the one or more errors and implementing a correction at the base station for a particular error associated with the particular user equipment.

In a third implementation, alone or in combination with one or more of the first and second implementations, performing the one or more actions includes identifying an application of the base station associated with the one or more errors and implementing a correction for the application.

In a fourth implementation, alone or in combination with one or more of the first through third implementations, performing the one or more actions includes determining that the feedback data identifies the one or more errors at the base station and implementing one or more corrections at the base station when the feedback data identifies the one or more errors at the base station.

In a fifth implementation, alone or in combination with one or more of the first through fourth implementations, generating the user equipment broad beam based on the configuration data includes generating the user equipment broad beam with a range of bands that includes the bands utilized by the plurality of user equipments and with a range of frequencies that includes the frequencies utilized by the plurality of user equipments.

In a sixth implementation, alone or in combination with one or more of the first through fifth implementations, the user equipment broad beam emulates one of a fifth-generation New Radio beam scanning process 3 or a sounding reference signal beam scanning.

In a seventh implementation, alone or in combination with one or more of the first through sixth implementations, the user equipment broad beam includes a millimeter wave range from approximately 24,250 megahertz to approximately 52,600 megahertz.

In an eighth implementation, alone or in combination with one or more of the first through seventh implementations, the base station is a gNodeB.

In a ninth implementation, alone or in combination with one or more of the first through eighth implementations, the user equipment broad beam emulates the bands utilized by the plurality of user equipments simultaneously with the frequencies utilized by the plurality of user equipments.

In a tenth implementation, alone or in combination with one or more of the first through ninth implementations, the user equipment broad beam emulates a downlink reception level change due to different respective reception beams associated with the plurality of user equipments.

In an eleventh implementation, alone or in combination with one or more of the first through tenth implementations, the user equipment broad beam emulates different respective beam directions based on a plurality of sounding reference signals with different respective uplink transmission levels.

In a twelfth implementation, alone or in combination with one or more of the first through eleventh implementations, performing the one or more actions includes identifying an application of the base station associated with the one or more errors and providing, for display, information identifying the application.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a testing device, configuration data identifying bands and frequencies utilized by a plurality of user equipments different from the testing device;
   generating, by the testing device, a user equipment broad beam, based on the configuration data, with a range of bands that includes the bands utilized by the plurality of user equipments and with a range of frequencies that includes the frequencies utilized by the plurality of user equipments;
   transmitting, by the testing device, the user equipment broad beam towards a base station with a single user equipment fixed broad beam antenna of the testing device, wherein the base station is different from the testing device;
   receiving, by the testing device and from the base station, feedback data associated with the user equipment broad beam transmitted towards the base station;
   determining, by the testing device, whether the feedback data identifies one or more errors at the base station for one or more of the plurality of user equipments; and
   performing, by the testing device, one or more actions based on determining whether the feedback data identifies the one or more errors at the base station for one or more of the plurality of user equipments.

2. The method of claim 1, wherein performing the one or more actions comprises one or more of:
   providing, for display, information identifying the one or more errors at the base station for the one or more of the plurality of user equipments;
   providing an alert notification for the one or more errors at the base station for the one or more of the plurality of user equipments; or
   modifying the user equipment broad beam when the feedback data identifies the one or more errors at the base station.

3. The method of claim 1, wherein performing the one or more actions comprises:
   identifying a particular user equipment of the plurality of user equipments associated with the one or more errors; and
   implementing a correction at the base station for a particular error associated with the particular user equipment.

4. The method of claim 1, wherein performing the one or more actions comprises:
   identifying an application of the base station associated with the one or more errors; and
   implementing a correction for the application.

5. The method of claim 1, wherein performing the one or more actions comprises:
   determining that the feedback data identifies the one or more errors at the base station; and implementing one or more corrections at the base station when the feedback data identifies the one or more errors at the base station.

6. The method of claim 1, wherein the user equipment broad beam emulates one of:
a fifth-generation New Radio beam scanning process 3, or
a sounding reference signal beam scanning.

7. The method of claim 1, wherein at least one of:
the user equipment broad beam is generated using a single fixed broad beam antenna, or
the user equipment broad beam is transmitted using the single fixed broad beam antenna.

8. A testing device, comprising:
one or more memories; and
one or more processors, coupled to the one or more memories, configured to:
   receive configuration data identifying bands and frequencies utilized by a plurality of user equipments different from the testing device;
   generate a user equipment broad beam, based on the configuration data, with a range of bands that includes the bands utilized by the plurality of user equipments and with a range of frequencies that includes the frequencies utilized by the plurality of user equipments,
      wherein the user equipment broad beam emulates one of:
         a fifth-generation New Radio beam scanning process 3, or
         a sounding reference signal beam scanning;
   transmit the user equipment broad beam towards a base station with a single user equipment fixed broad beam antenna of the testing device, wherein the base station is different from the testing device;
   receive, from the base station, feedback data associated with the user equipment broad beam transmitted towards the base station;
   determine whether the feedback data identifies one or more errors at the base station for one or more of the plurality of user equipments; and
   perform one or more actions based on determining whether the feedback data identifies the one or more errors at the base station for one or more of the plurality of user equipments.

9. The testing device of claim 8, wherein the user equipment broad beam includes a millimeter wave range from approximately 24,250 megahertz to approximately 52,600 megahertz.

10. The testing device of claim 8, wherein the base station is a gNodeB.

11. The testing device of claim 8, wherein the user equipment broad beam emulates the bands utilized by the plurality of user equipments simultaneously with the frequencies utilized by the plurality of user equipments.

12. The testing device of claim 8, wherein the user equipment broad beam emulates a downlink reception level change due to different respective reception beams associated with the plurality of user equipments.

13. The testing device of claim 8, wherein the user equipment broad beam emulates different respective beam directions based on a plurality of sounding reference signals with different respective uplink transmission levels.

14. The testing device of claim 8, wherein the one or more processors, to perform the one or more actions, are configured to:
identify an application of the base station associated with the one or more errors; and
provide, for display, information identifying the application.

15. A non-transitory computer-readable medium storing a set of instructions, the set of instructions comprising:
one or more instructions that, when executed by one or more processors of a testing device, cause the testing device to:
   receive configuration data identifying bands and frequencies utilized by a plurality of user equipments different from the testing device;
   generate, based on the configuration data, a user equipment broad beam with:
      a range of bands that includes the bands utilized by the plurality of user equipments, and
      a range of frequencies that includes the frequencies utilized by the plurality of user equipments;
   transmit the user equipment broad beam towards a base station with a single user equipment fixed broad beam antenna of the testing device, wherein the base station is different from the testing device;
   receive, from the base station, feedback data associated with the user equipment broad beam transmitted towards the base station;
   determine whether the feedback data identifies one or more errors at the base station for one or more of the plurality of user equipments; and
   perform one or more actions based on determining whether the feedback data identifies the one or more errors at the base station for one or more of the plurality of user equipments.

16. The non-transitory computer-readable medium of claim 15, wherein the one or more instructions, that cause the testing device to perform the one or more actions, cause the testing device to one or more of:
provide, for display, information identifying the one or more errors at the base station for the one or more of the plurality of user equipments;
provide an alert notification for the one or more errors at the base station for the one or more of the plurality of user equipments;
modify the user equipment broad beam when the feedback data identifies the one or more errors at the base station;
identify a particular user equipment of the plurality of user equipments associated with the one or more errors and implement a correction at the base station for a particular error associated with the particular user equipment; or
identify an application of the base station associated with the one or more errors and implement a correction for the application.

17. The non-transitory computer-readable medium of claim 15, wherein the one or more instructions, that cause the testing device to perform the one or more actions, cause the testing device to:
determine that the feedback data identifies the one or more errors at the base station; and
implement one or more corrections at the base station when the feedback data identifies the one or more errors at the base station.

18. The non-transitory computer-readable medium of claim 15, wherein the user equipment broad beam emulates one of:
a fifth-generation New Radio beam scanning process 3, or
a sounding reference signal beam scanning.

19. The non-transitory computer-readable medium of claim 15, wherein the user equipment broad beam emulates a downlink reception level change due to different respective reception beams associated with the plurality of user equipments.

20. The non-transitory computer-readable medium of claim 15, wherein the user equipment broad beam emulates different respective beam directions based on a plurality of sounding reference signals with different respective uplink transmission levels.

\* \* \* \* \*